Sept. 8, 1953  H. I. MANDOLF  2,651,477
FISHING REEL SPOOL
Filed Sept. 26, 1949
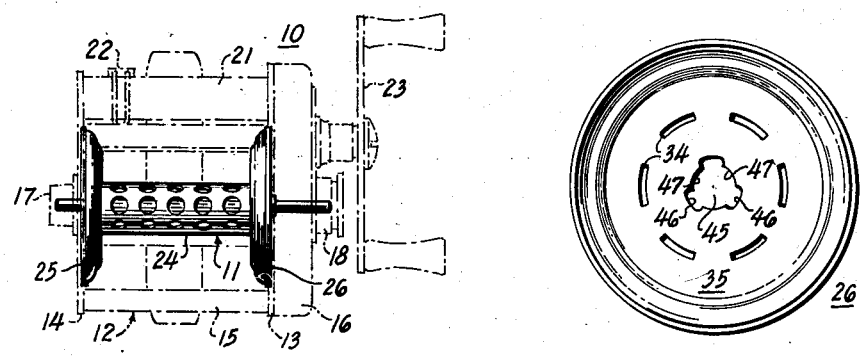
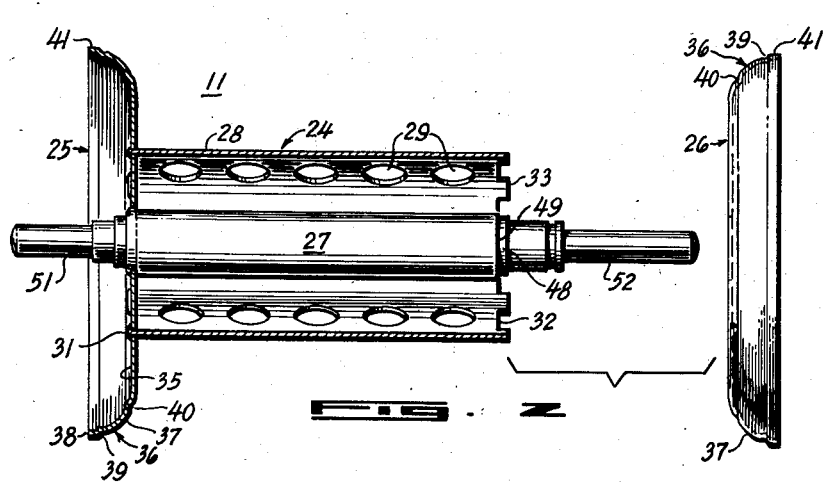
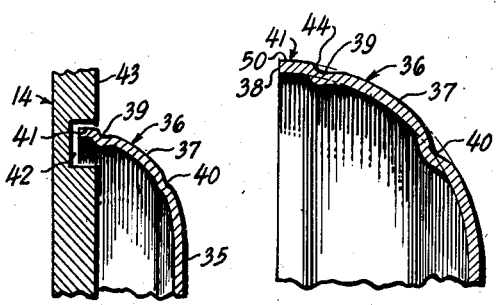
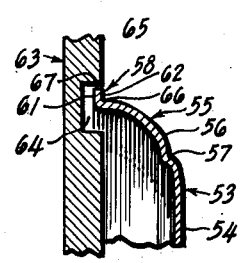
INVENTOR.
Henry I. Mandolf
BY
Walter J. Jason
ATTORNEY Patented Sept. 8, 1953

2,651,477

UNITED STATES PATENT OFFICE 2,651,477

FISHING REEL SPOOL

Henry Ikarus Mandolf, San Diego, Calif., assignor to Langley Corporation, San Diego, Calif., a corporation of California Application September 26, 1949, Serial No. 117,837

5 Claims. (Cl. 242—123)

This invention relates to fishing reels and more particularly to improvements in spools therefor.

It is well known in the art that the performance characteristics of bait casting reels are determined primarily by the weight of the rotating parts thereof. Therefore to obtain any marked or useful gain in performance it becomes necessary to effect or arrive at a reduction in this weight. This, however, necessitates the exercise of great care in design since the reduction in weight to be of value must be accomplished without sacrifice of strength of parts. The major portion of the rotating weight of a fishing reel is embodied in the spool, and it is here that a reduction in weight most advantageously can be effected.

It is therefore an object of this invention to provide an improved construction for a fishing reel spool which permits of a substantial saving in the weight thereof without any sacrificing of its capacity or its strength.

Another object of the invention is to provide a novel spool for a level winding casting reel having a minimum moment of inertia and which will have no undue backlash tendencies.

Another object of the invention resides in the provision of a fishing reel spool which embodies a relatively large diameter line supporting drum to the opposite ends of which are connected novel discs having an improved construction permitting reduction in the weight thereof.

With the introduction of new forms of high strength fishing lines, made of nylon and similar material, new problems in design have been presented. The new lines are relatively very elastic in comparison to the old forms of fishing lines and as a result will be of a much greater than normal length when wound upon a spool while in wet condition. These new lines on drying will contract a relatively great amount and in this process move longitudinally upon the drum of the spool to apply substantial forces against the end discs. The discs must be capable of withstanding these forces without collapsing, tearing free of the drum, or, under excessive deflection, affecting the small surrounding clearances. Another difficulty involved in the use of the new fishing lines arises out of the very small diameters which these new lines may assume. The small diameter lines are more apt to slip off the spool over the discs to move into recesses in the fishing reel end plates and become jammed between the discs and the end plates with consequent cutting or serious damage to the lines.

The present invention therefore has for one of its objects the provision of a fishing reel spool which has an improved form of construction adapting it for use with the high strength, small diameter fishing lines, the discs and drum comprising the spool effectively withstanding the substantial forces applied thereto by this type of line. At the same time the spool will be of lighter weight than known spools. Such improved form of construction contemplates the use of discs of novel form which may be built to closer tolerances than formerly whereby less clearance is provided between the discs and the fishing reel end plates consequently lessening occurrences of jammed fishing lines.

Another object of the invention lies in providing a fishing reel spool embodying improved form which are constructed to adapt the discs to more effectively maintain a fishing line thereon; and which discs further embody a construction making the discs capable of deflecting the fishing line, should it slip from the spool, to prevent jamming of the line.

A further object of the invention is to provide an improved fishing reel spool of the character set forth which is inexpensive to produce but has great strength and is effective and efficient in operation.

Other objects and features of the present invention will be readily apparent to those skilled in the art from the following specification and appended drawings wherein is illustrated a preferred form of the invention, and in which:

Figure 1 is a side elevational view of a spool constructed in accordance with the present invention and embodied in a conventional fishing reel which is shown in broken lines.

Figure 2 is a view of the parts forming the spool, with certain parts in section, and illustrating one spool flange secured to the drum, and the other spool flange separate therefrom.

Figure 3 is a front view of a spool flange as it appears prior to attachment to the drum.

Figure 4 is an enlarged fragmental section illustrating the relationship of a spool flange and the juxtaposed fishing reel end plate.

Figure 5 is an enlarged fragmentary sectional view of a spool flange constructed in accordance with the present invention; and Figure 6 is an enlarged fragmental sectional view showing a modified spool flange and its relation to a juxtaposed fishing reel end plate.

Referring now with more particularity to the drawings, there is shown in Figure 1 a fishing reel indicated generally by the numeral 10, and illustrated by broken lines. Operatively supported in the fishing reel 10 is the spool 11 of the present invention, which is shown in full lines.

The spool 11 of this invention is intended for use with conventional fishing reels and the particular fishing reel 10 illustrated in broken lines in the drawings is but a preferred form. The reel 10 includes a frame 12 comprised essentially of a head plate 13, a tail plate 14, and a plurality of circumferentially spaced pillars 15 interconnecting the two plates 13 and 14, to maintain them in required spatial relationship. An annular housing member 16 mounted on the head plate 13 supports a bearing 17; a second bearing 18 is carried upon tail plate 14. The bearings 17 and 18 cooperate to journal suitably the spool 11 for rotation within the frame 12.

A level wind mechanism of conventional construction comprising the usual traversing line carriage and line carriage shaft, neither shown, is arranged on the reel frame 12 above the spool 11. A transversely extending housing 21 supported between and by the head plate 13 and tail plate 14 encloses the line carriage and its shaft. The traversing line carriage includes a line guide eye 22 which extends over the housing 21 and is movable back and forth between the head plate 13 and tail plate 14. The line guide eye 22 engages the incoming fishing line and causes it to be uniformly wound on the spool 11 as the line is reeled in and the line guide eye 22 travels between the spaced plates 13 and 14. A double-handled winding crank 23, rotatably supported on annular housing member 16, drives the level wind mechanism and the spool 11 through a suitable gearing system, not shown, disposed within annular housing member 16.

The spool 11 comprises a drum 24, a pair of similarly constructed dished flange members or discs 25 and 26 positioned contiguous the opposite ends of the drum 24, and a cylindrical shaft 27 located concentrically to drum 24.

The drum 24 embodies a hollow, relatively large diameter, integral cylinder 28 provided with a plurality of perforations 29 for lightening the weight thereof. The drum 24 may be composed of any suitable light weight material but is preferably made of aluminum, which is selected for its favorable strength to weight ratio. The drum 24 is formed with the opposite ends 31 and 32 thereof each provided with a plurality of annularly arranged, equally spaced, integral, longitudinally extending projecting portions or lugs 33.

The series of lugs 33 at the opposite ends 31 and 32 of drum 24 are adapted to be passed through arcuate openings 34 provided in the discs 25 and 26, which discs are positioned adjacent ends 31 and 32, respectively. The openings 34 are so annularly arranged in discs 25 and 26 as to conform to the spacing of and to align with the lugs 33 to be received. The lugs 33 after passing through the openings 34 have the ends thereof swaged to secure them to the discs 25 and 26 and thus effect an interlocked relationship between the drum 24 and the discs 25 and 26.

Figure 2 illustrates the appearance of the ends of the drum 24 prior to and after swaging of the lugs 33. As shown a series of lugs 33 have been passed through openings 34 in disc 25 and the ends of the lugs 33 have been deformed to a substantially larger outline than the openings 34 to effect a rigid interconnection between drum 24 and disc 25. Disc 26 is illustrated as spaced from the end 32 of drum 24 preparatory to its being moved contiguous this end 32 to project lugs 33 of end 32 into openings 34 in the disc, after which they will be swaged to affix them to disc 26.

Each of the discs 25 and 26 comprise a base portion 35 and an annular arcuate flange 36. Each flange 36 provides a convex peripheral surface 37 inwardly curving from the vertical plane of annular rim 38 of flange 36 and terminating at the base portion 35. The curving convex surfaces 37 are each suitably creased to effect a pair of annular troughs or furrows 39 and 40, which are provided for reasons to be explained hereinafter. Trough 39 is located on convex surface 37 adjacent annular rim 38 and trough 40 is disposed between trough 39 and base portion 35. Providing a trough 39 results in the formation of an annular peripheral land 41. Surfaces 37 of discs 25 and 26 being inwardly curved toward drum 24 effect directing guide surfaces which tend to force a fishing line downwardly toward the drum 24 as it is being wound upon drum 24.

Reduction in weight of the spool 11 of the present invention is attained by reducing the weight of the discs 25 and 26. The discs 25 and 26 are formed of a light-weight material, preferably aluminum. This invention contemplates and intends the use of aluminum in very thin gages, preferably .020 inch or less. Because of the small clearances desired between land 41 and the fishing reel end plates to prevent jamming of the fishing line, as will be more fully hereinafter described, it is essential that the flange 36 have maximum concentricity, or substantially true circular form. However, in forming material of this minimal thickness in order to provide an annular convex arcuate peripheral flange 36 it has been found that concentricity of the flange is extremely difficult of attainment due to the natural spring-back of the metal after it has been formed. The desired concentricity for flanges 36 has been attained in this invention by breaking the grain of the metal used for making the flanges 36. Breaking of the grain of the metal is achieved by the provision of the two annular creases or troughs 39 and 40 in the curving convex surfaces 37. These creases 39 and 40, it has been found, will eliminate the natural spring-back or elasticity of the metal and make it possible to form, by stamping, or in any other well known manner, a thin gage flange of true dimensions.

While two creases or troughs 39 and 40 have been shown herein, it is understood that a greater number of creases could be formed in the flange 36 which will assist in obtaining the concentricity desired. It has been found that the use of two creases alone will effect a disc having true dimensions.

As shown in Figure 1, with spool 11 in operative position within reel frame 12, disc 25 is positioned juxtaposed to tail plate 14 and disc 26 lies juxtaposed to head plate 13. Figure 4 illustrates the relative positions of tail plate 14 and disc 25. It is understood that the relationship between disc 26 and head plate 13 is the same as that between disc 25 and tail plate 14 and therefore the following discussion of tail plate 14 and disc 25 is applicable also to disc 26 and head plate 13.

As stated hereinbefore providing the trough 39 in the convex surface 37 of flange 36 adjacent its outer rim results in the formation of an annular land 41 which surrounds the entrance to the concave or open face of the disc. With disc 25 positioned adjacent tail plate 14 its annular land 41 is projected into an annular groove 42 formed in the rear surface or face 43 of the tail plate 14. As seen in the drawings, the disc 25 is so positioned that its annular trough 39 is located outside of the plane of rear surface 43 of plate 14. Trough 39 in addition to eliminating metal spring-back has a secondary purpose. It provides a receptacle within which a fishing line may naturally fall should it ride up on surface 37. Thus trough 39 effectively lessens the possibility of a line being forced into the crevice defined by the juxtaposed flange 36 and tail plate 14. Locating the trough 39 outside of the plane of rear face 43 of tail plate 14, as stated, is advantageous in that the defining walls 44 of the trough 39 will be properly positioned to deflect a line upwardly, should it by chance leap from the trough 39, to impinge against that portion of the rear face 43 which is above the annular groove 42 and then fall back on to the convex surface 37 of the flange 36.

The annular land 41 located at the largest diameter of flange 36, serves as a means for effecting a concentricity correction should it by chance be required after the spool has been assembled. This correction is attained by machining the peripheral surface 50 of land 41 an amount necessary to effect the desired concentricity with the journal portions of shaft 27.

Shaft 27 of spool 11 is positioned concentrically relative to drum 24 and discs 25 and 26 and is suitably connected to the discs 25 and 26 to provide a support for spool 11. Each of the discs 25 and 26 have formed in their base portions 35 a central opening 45. Three notched openings 46 extend from this central opening 45 to effect three annularly arranged flange portions 47. The discs 25 and 26 are positioned upon either end of the elongated integral steel shaft 27 by fitting the central openings 45 thereof over turned-down annular shaft portions 48 formed on shaft 27. After being fitted upon shaft portions 48 the discs 25 and 26 are moved inwardly until their flange portions 47 abut spaced annular supporting shoulders 49 formed on shaft 27 adjacent the annular shaft portions 48. Excessive length is provided the annular shaft portions 48 which permits a rolling, or spinning, operation to deform the material of the shaft portions 48 to force this material over the flanges 47, upon the area of the base portion 35, immediately surrounding opening 45, and into the notches 46 thereby securely locking the discs 25 and 26 to the shaft 27. The opposite ends of shaft 27 are formed into suitable bearing portions 51 and 52, which are adapted to be journaled in the bearings 17 and 18 mounted on head plate 13 and tail plate 14 to rotatively mount the shaft 27.

Figure 6 illustrates a modification of this invention wherein the discs provided for attachment to the ends of the drum have been changed in certain details of their construction. A modified disc 53 is shown which comprises a base portion 54, and an annular arcuate flange 55 having an inwardly curving convex peripheral surface 56, with an annular trough or crease 57 formed in the surface 56 adjacent base portion 54. In surrounding relationship to the entrance to the open face of the disc 53 there is provided an outwardly projecting annular flange portion 58, directed substantially perpendicularly or transverse to the axis of disc 53 and having an outer annular face 61 and an inner annular face 62, in parallel. When disc 53 is juxtaposed to an end plate of a fishing reel, as shown in Figure 6 wherein the end plate is indicated by the numeral 63, the outwardly projecting annular flange portion 58 extends into groove 64 only so far as to position its outer annular face 61 therein, but the opposite annular face 62 is spaced from or at most located substantially in the plane of rear face 65 of end plate 63. The rear annular face 62 will serve to deflect a fishing line upwardly to strike the rear face 65 of end plate 63 and thereby prevent the line entering into the space between the annular flange portion 58 and end plate 63.

Providing the annular trough 57 and the outwardly extending annular flange 58 results in the convex surface 56 of disc 53 being severely deformed. This deformation breaks the grain of the metal used in the disc along two circular paths. One path lies along the annular trough 57 and the other path or crease is provided by the annular intersection, indicated by numeral 66, of outwardly extending annular flange 58 with convex surface 56, and this latter crease results when annular flange 58 is bent to project at a severe angle to convex surface 56. Breaking the grain of the metal, as described, will eliminate the natural spring-back or elasticity of the metal and make it possible to form disc 53 with true concentricity. If concentricity correction should be required the annular peripheral face 67 can be machined an amount necessary to securing the desired concentricity. In this respect outwardly projecting flange 58 is similar to annular land 41 of discs 25 and 26.

From the above description, it is apparent that disc 53 is similar to discs 25 and 26 in most respects. It has a base portion 54, corresponding to base portion 35 of the first described discs, and it also has an annular arcuate flange 55 which is provided with an inwardly curving convex peripheral surface 56. However, where discs 25 and 26 employ two annular troughs 39 and 40 to crease the metal to break the grain thereof, the disc 53 achieves breaking of the grain through formation of outwardly projecting annular flange portion 58 and the trough 57.

There has been described herein a novel form of spool for use in fishing reels which is characterized by its lightness, strength and simplicity. The method and construction used for securing the discs to each end of the drum and of attaching the shaft to the discs results in a particularly rigid device well adapted for use with high-strength, elastic, small diameter, fishing lines. The new construction of this invention utilizes for the discs permits the use of very thin gage light-weight metal thereby to reduce the weight of the spool and result in a device having a minimum moment of inertia. The preferred light-weight metals employed by the invention for the discs are aluminum alloys and magnesium alloys because of their favorable strength. Concentricity of the discs is readily secured in this invention allowing the proper positioning of the discs relative to the fishing reel end plates so that there is less possibility of jamming the fishing line in a crevice. The discs further are formed to render them particularly effective for deflecting fishing line away from a crevice.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A fishing reel spool comprising an elongated shaft, a pair of discs formed of thin gage metal carried upon said shaft in spaced relation to one another, said discs each comprising a base portion and an annular arcuate flange portion having a convex peripheral surface, said annular arcuate flange portion having an annular crease provided in its peripheral surface adjacent its outer rim and a second annular crease provided between the first annular crease and the base portion, and a hollow cylindrical drum in concentric relation with said shaft having its surface perforated and being of a diameter relatively much larger than the diameter of said shaft, integral projecting portions extending parallel to the longitudinal axis of the drum provided at opposite ends of said drum adapted to extend through aligned openings provided by said discs and to be affixed to the discs rigidly to connect said discs to said drum.

2. A fishing reel spool comprising an elongated shaft, a pair of discs formed of thin gage metal carried upon said shaft in spaced relation to one another, and a hollow cylindrical drum in concentric relation with said shaft interconnecting said discs, said discs each comprising a base portion and an annular arcuate flange portion convex adjacent to said drum, said annular arcuate flange portion having an annular crease provided adjacent its outer rim and a second annular crease provided between the first annular crease and the base portion, said base portions of said discs each having an opening centrally therethrough and a plurality of annularly arranged integral flange portions extending into said opening, spaced annular shoulders on said shaft against which said annularly arranged integral flange portions abut when said discs are disposed on said shaft, said integral flange portions being affixed to said shaft by material thereof engaging said integral flange portions.

3. A fishing reel spool comprising an elongated shaft, a pair of discs formed of thin gage metal carried upon said shaft in spaced relation to one another and facing in opposite directions, said discs each comprising a base portion and an annular arcuate flange portion having a convex peripheral surface curving inwardly and a concave surface facing outwardly, said annular arcuate flange portion having an annular land surrounding the entrance to said concave surface and having a pair of annular creases provided in the peripheral convex surface, with one of said creases located adjacent said annular land and with the other crease located between the first mentioned crease and the base portion, and a hollow cylindrical drum in concentric relation with said shaft having its surface perforated and being of a diameter relatively much larger than the diameter of said shaft, integral projecting portions extending parallel to the longitudinal axis of the drum provided at opposite ends of said drum adapted to extend through aligned openings provided by said discs to be affixed to the discs rigidly to connect said discs to said drum.

4. A fishing reel spool comprising an elongated shaft, a pair of discs formed of thin gage metal carried upon said shaft in spaced relation to one another facing in opposite directions, said discs each comprising a base portion and an annular arcuate flange portion having a convex peripheral surface curving inwardly and a concave surface facing outwardly, said annular arcuate flange portion having an annular land surrounding the entrance to said concave surface and having a pair of annular creases provided in the peripheral convex surface, with one of said creases located adjacent said annular land and with the other crease located between the first mentioned crease and the base portion, said base portions of said discs each having an opening centrally therethrough and a plurality of annularly arranged integral flange portions extending into said opening, spaced annular shoulders on said shaft against which said annularly arranged integral flange portions abut when said discs are disposed on said shaft, said integral flange portions being affixed to said shaft by material thereof engaging said integral flange portions, and a hollow cylindrical drum in concentric relation with said shaft having its surface perforated and being of a diameter relatively much larger than the diameter of said shaft, integral projecting portions extending parallel to the longitudinal axis of the drum provided at opposite ends of said drum adapted to extend through aligned openings provided by said discs to be affixed to the discs rigidly to connect said discs to said drum.

5. A fishing reel spool comprising an elongated integral shaft, a pair of discs formed of aluminum alloy having a thickness of not more than .020 inch carried upon said shaft in spaced relation to one another facing in opposite directions, said discs each comprising a base portion and an annular arcuate flange portion having a convex peripheral surface curving inwardly and a concave surface facing outwardly, said annular arcuate flange portion having an annular land surrounding the entrance to said concave surface and having a pair of annular creases provided in the peripheral convex surface, with one of said creases located adjacent said annular land and with the other crease located between the first mentioned crease and the base portion, said base portions of said discs each having an opening centrally therethrough and a plurality of annularly arranged integral flange portions extending into said opening, spaced annular shoulders on said shaft against which said annularly arranged integral flange portions abut when said discs are disposed on said shaft, said integral flange portions being affixed to said shaft by material thereof engaging said integral flange portions, and a hollow integral cylindrical drum in concentric relation with said shaft having its surface perforated and being of a diameter relatively much larger than the diameter of said shaft, integral projecting portions extending parallel to the longitudinal axis of the drum provided at opposite ends of said drum adapted to extend through aligned openings provided by said discs to be affixed to the discs rigidly to connect said discs to said drum.

HENRY IKARUS MANDOLF.

References Cited in the file of this patent

UNITED STATES PATENTS

| Number | Name | Date |
|---|---|---|
| 459,511 | Loomis | Sept. 15, 1891 |
| 520,189 | Roehm | May 22, 1894 |
| 754,117 | Bedworth | Mar. 8, 1904 |
| 2,051,259 | James | Aug. 18, 1936 |
| 2,336,981 | Clickner | Dec. 14, 1943 |